(12) United States Patent
Yezerets et al.

(10) Patent No.: US 8,146,562 B2
(45) Date of Patent: Apr. 3, 2012

(54) SYSTEM, METHOD AND APPARATUS FOR FUEL INJECTOR DIAGNOSTICS

(75) Inventors: Aleksey Yezerets, Columbus, IN (US);
Pradeep Prasad, Columbus, IN (US);
Yuetao Zhang, Columbus, IN (US);
Daniel D. Wilhelm, Nashville, IN (US);
Neal W. Currier, Columbus, IN (US)

(73) Assignee: Cummins Inc., Columbus, IN (US)

( * ) Notice: Subject to any disclaimer, the term of this patent is extended or adjusted under 35 U.S.C. 154(b) by 314 days.

(21) Appl. No.: 12/590,788

(22) Filed: Nov. 13, 2009

(65) Prior Publication Data

US 2011/0113756 A1    May 19, 2011

(51) Int. Cl.
*F02B 77/08* (2006.01)
*F01N 11/00* (2006.01)

(52) U.S. Cl. ..................... 123/198 D; 60/285
(58) Field of Classification Search .............. 123/198 D, 123/299, 304, 690; 60/276, 285, 299; 73/114.72; 701/103

See application file for complete search history.

(56) References Cited

U.S. PATENT DOCUMENTS

| | | | | |
|---|---|---|---|---|
| 5,105,789 A | * | 4/1992 | Aramaki et al. | 123/520 |
| 5,184,595 A | * | 2/1993 | Maeda et al. | 123/690 |
| 5,363,647 A | * | 11/1994 | Ohuchi et al. | 60/276 |
| 5,438,827 A | * | 8/1995 | Ohuchi et al. | 60/276 |
| 5,640,846 A | * | 6/1997 | Ohuchi et al. | 60/276 |
| 5,956,945 A | | 9/1999 | Kumar et al. | |
| 5,996,337 A | | 12/1999 | Bosser et al. | |
| 6,026,639 A | | 2/2000 | Kumar | |
| 6,301,881 B1 | | 10/2001 | Kumar | |
| 2007/0298504 A1 | | 12/2007 | Mueller et al. | |
| 2010/0186491 A1 | * | 7/2010 | Shibata et al. | 73/114.72 |

FOREIGN PATENT DOCUMENTS

WO    WO 2004/072460 A1    8/2004

* cited by examiner

*Primary Examiner* — Mahmoud Gimie
(74) *Attorney, Agent, or Firm* — Matthew D. Fair; J. Stephen Wills; Krieg DeVault LLP

(57) ABSTRACT

A method includes providing a system having a fluid flow, a fuel injector and an oxygen sensor disposed in the fluid flow, where the oxygen sensor is downstream of the fuel injector. The method includes determining a first air fuel ratio, changing an injection rate of the fuel injector and determining a second air fuel ratio, and determining a fault value for the fuel injector from the first air fuel ratio and the second air fuel ratio. The method further includes determining the fault value for the fuel injector by determining a difference between the first air fuel ratio and the second air fuel ratio, and by determining that the fault value is positive in response to the difference being lower than a passing threshold value. The method includes changing injection rates of the fuel injector for specified periods of time short enough to significant disruption of system temperatures.

33 Claims, 6 Drawing Sheets

SYSTEM, METHOD AND APPARATUS FOR FUEL INJECTOR DIAGNOSTICS

BACKGROUND

The present invention relates to diagnosing aftertreatment hardware, and more particularly but not exclusively relates to diagnosing a fuel injector in an aftertreatment system. Emissions strategies for internal combustion engines often include aftertreatment components such as oxidation catalysts, $NO_x$ adsorbers, and/or particulate filters. Many aftertreatment components require periodic regeneration to function properly. Some aftertreatment systems include a fuel injector (or "closer") in the exhaust flow to assist with regeneration or for other reasons. An undetected failure of the fuel injector may result in a failure of an aftertreatment component or a non-compliant aftertreatment system. Accordingly, there is a demand for further contributions in this area of technology.

SUMMARY

One embodiment is a unique procedure for detecting a failure of a fuel injector with the use of a single oxygen sensor. Other embodiments include unique systems and methods to detect a failure of a fuel injector. Further embodiments, forms, objects, features, advantages, aspects, and benefits shall become apparent from the following description and drawings.

DESCRIPTION OF THE ILLUSTRATIVE EMBODIMENTS

Figure 1:
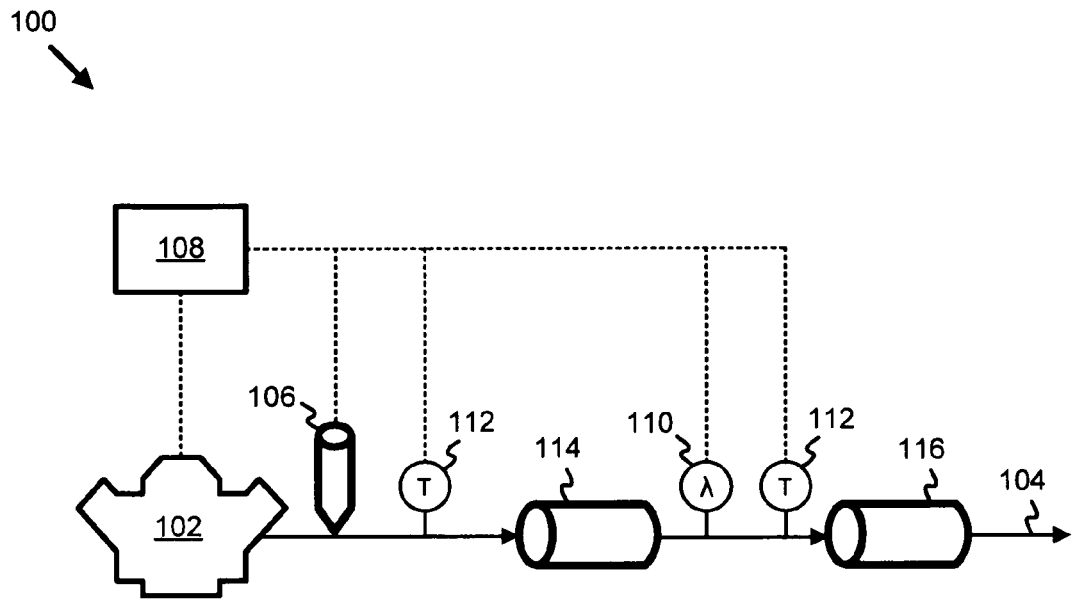
FIG. 1 is a schematic diagram of a system that determines a fuel injector fault value.

For the purposes of promoting an understanding of the principles of the invention, reference will now be made to the embodiments illustrated in the drawings and specific language will be used to describe the same. It will nevertheless be understood that no limitation of the scope of the invention is thereby intended, and any alterations and further modifications in the illustrated embodiments, and any further applications of the principles of the invention as illustrated therein as would normally occur to one skilled in the art to which the invention relates are contemplated and protected. Where the term "about" is used to describe a value or a range, "about" is intended to cover all values and ranges that are functionally equivalent to the described ranges.

FIG. 1 is a schematic diagram of a system 100 that determines a fuel injector fault value. In certain embodiments, the system 100 includes an internal combustion engine 102 that produces an exhaust flow 104. The engine 102 may be a gasoline, diesel, turbine, or any type of engine 102 known in the art. The system 100, in certain embodiments, further includes a fuel injector 106 disposed in the exhaust flow 104. The fuel injector 106 may inject a hydrocarbon into the exhaust flow 104, for example diesel, gasoline, natural gas, propane. In certain embodiments, the fuel injector 106 may inject hydrogen, a reductant, or any composition tending to reduce an amount of oxygen in the exhaust. The fuel injector 106 may be controlled by a controller 108.

In certain embodiments, the system 100 further includes an oxygen sensor 110 disposed in the exhaust flow 104 at a location downstream of the fuel injector 106. The oxygen sensor 110 may be termed a "lambda" sensor, and may be a switching sensor (i.e. rich-lean determination only) or a wide range sensor (i.e. a range of $\lambda$ values). In certain embodiments, the system 100 further includes one or more temperature sensors 112 disposed in the exhaust flow 104. In certain embodiments, the system 100 includes at least one temperature sensor 112 positioned to measure a temperature related to a temperature of an oxidation catalyst 114. For example, a temperature sensor 112 may measure a temperature upstream of the oxidation catalyst 114, downstream of the oxidation catalyst 114, or both upstream and downstream. In certain embodiments, the temperature of the oxidation catalyst 114 and/or other aftertreatment component is estimated from a temperature sensor 112, for example from a filtered or averaged value of one or more temperature sensors 112.

Figure 2:
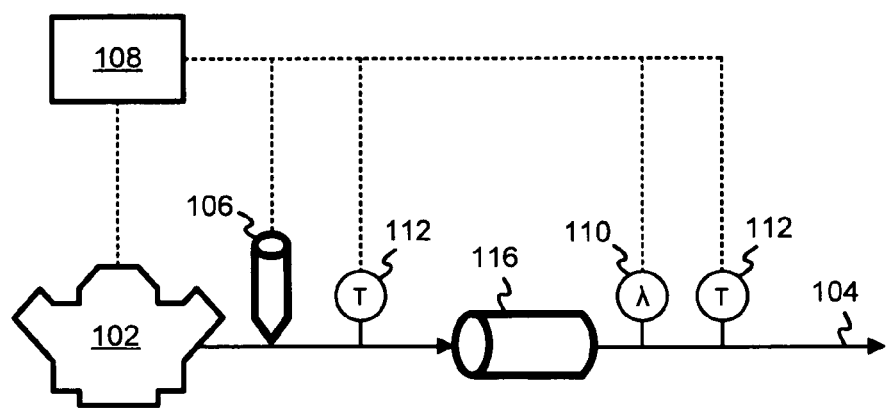
FIG. 2 is a schematic diagram of an alternate embodiment of a system that determines a fuel injector fault value.

In certain embodiments, the system 100 further includes one or more aftertreatment system components 114, 116. In the illustration of FIG. 1, an oxidation catalyst 114 is interposed between the fuel injector 106 and the oxygen sensor 110 and a particulate filter 116 is downstream of the oxygen sensor 110. Referring to the illustration of FIG. 2, a particulate filter 116 is interposed between the fuel injector 106 and the oxygen sensor 110. In certain embodiments, the oxygen sensor 110 is downstream of the fuel injector 106 without an aftertreatment component 114, 116 interposed between. The system 100 may include any aftertreatment components and configurations including, without limitation, close-coupled catalysts, catalyzed particulate filters, diffusers, $NO_x$ adsorption catalysts, three-way catalysts, four-way catalysts, and lean $NO_x$ catalysts.

In certain embodiments, the system 100 includes a processing subsystem. The processing subsystem includes hardware (e.g. processor, memory, storage, input/output devices) and programming to execute various operations in the system 100. The processing subsystem, in certain embodiments, includes a controller 108 which may be a single device and/or a distributed device. For example, functions of the controller 108 may be performed by an engine controller, an aftertreatment controller, "smart" devices (e.g. sensors and/or actuators with processing capabilities) and/or by other control devices that may inter-communicate through a datalink, network, or wireless communications. In the illustrative embodiments herein, all processing operations are described in relation to the controller 108 to promote clarity in describing operations. In certain embodiments, the controller 108 communicates with various sensors 110, 112 and actuators 106 in the system 100, and in certain further embodiments the controller 108 communicates with the engine 102.

In certain embodiments, the controller 108 determines a first fuel injection rate and a first air fuel ratio (AFR). The controller 108, in certain embodiments, commands the fuel injector 106 to a second fuel injection rate for a specified period and determines a second AFR. In certain embodiments, the controller 108 determines a fault value in response to the first AFR and the second AFR. Detailed operations of certain embodiments of the controller 108 are included in the discussion referencing FIG. 3.

Figure 3:
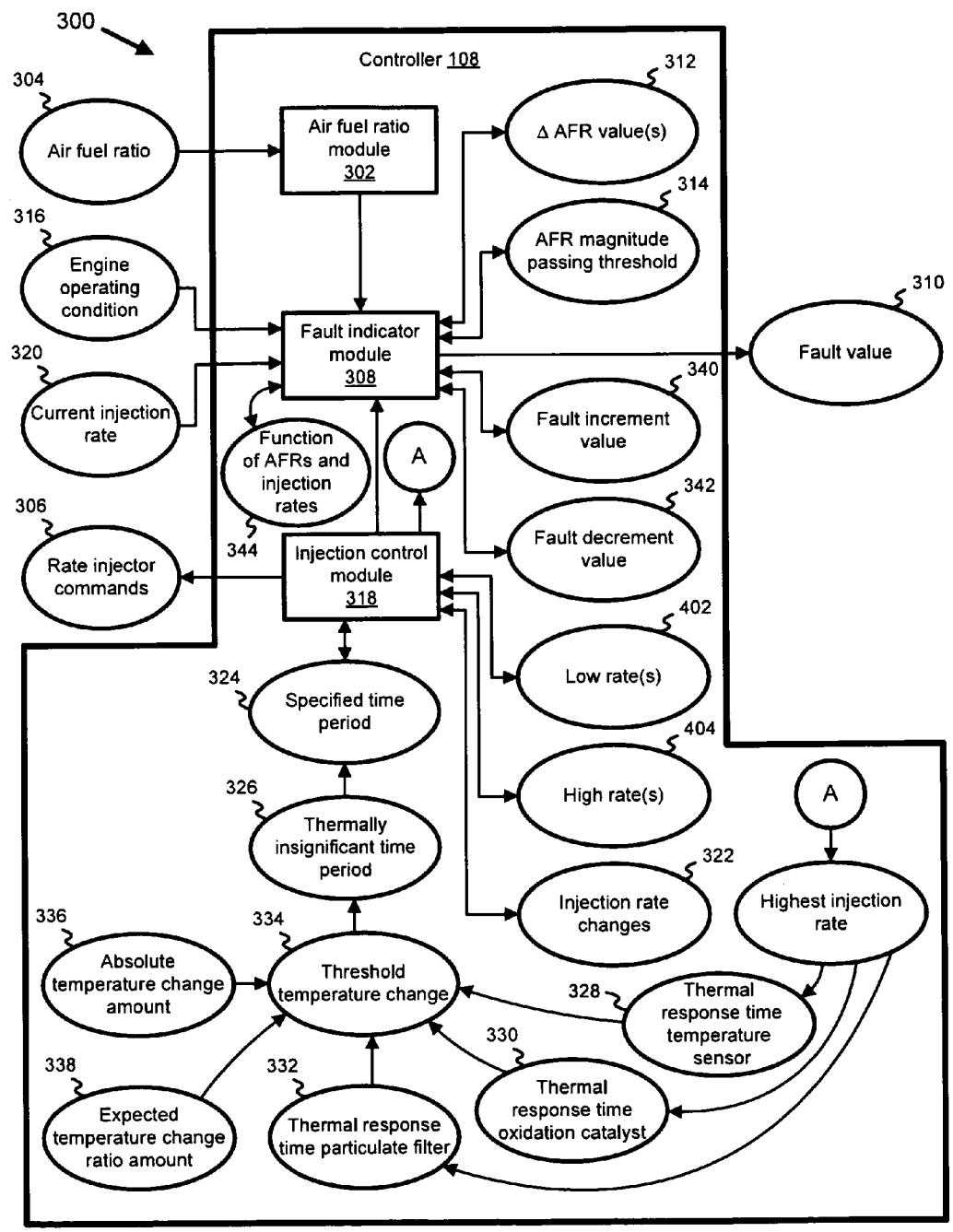
FIG. 3 is a schematic diagram of a processing subsystem that that determines a fuel injector fault value.

FIG. 3 is a schematic diagram of a processing subsystem 300 that determines a fuel injector fault value 310. In certain embodiments, various operations of the processing subsystem 300 are performed by the controller 108. In certain embodiments, an air fuel ratio module 302 determines an air fuel ratio 304 as a first air fuel ratio, an injection control module 318 changes an injection rate 320 of the fuel injector 106 by providing an injection rate command 306, and the air fuel ratio module 302 determines the air fuel ratio 304 as a second air fuel ratio. In certain embodiments, a fault indicator module 308 determines a fault value 310 for the fuel injector 106 in response to the first air fuel ratio and the second air fuel ratio.

In certain embodiments, the fault indicator module determines the fault value 310 by determining a difference (e.g. an AFR delta ($\Delta$) 312) between the first AFR and the second AFR, and determining that the fault value 310 is positive in response to the AFR $\Delta$ 312 being lower than a passing threshold value 314. For example, the first AFR may be a lambda of 1.5 and the second AFR may be a lambda of 0.9, for an AFR $\Delta$ 312 of 0.6 (or −0.6). If the passing threshold value 314 is 0.4, then the fault value 310 in the example is not positive. In certain embodiments, the controller 108 determines the fault value 310 by determining the AFR $\Delta$ 312 and determining whether the AFR delta 312 has a magnitude greater than a passing threshold value 314.

Various corrections and conventions are contemplated herein. In certain embodiments, the fault indicator module 308 determines the passing value threshold 314 in response to at least one engine 102 operating condition 316. For example, if the engine 102 is flowing 40 lbm/min exhaust flow 104 with a lambda 1.5 in a first operating condition 316, and the engine is flowing 80 lbm/min exhaust flow 104 with a lambda 1.5 in a second operating condition 316, the passing value threshold 314 may be modified. In the example, a fuel injection rate change 322 in the second engine operating condition 316 would ordinarily be expected to create about ½ the AFR $\Delta$ 312 than an identical fuel injection rate change 322 in the first engine operating condition 316, indicating that the passing value threshold 314 is expected to be lower in the second engine operating condition 316.

In certain embodiments the fault indicator module 308 corrects the AFR $\Delta$ value(s) 312 in response to at least one engine operating condition 316. In certain circumstances, the engine operating condition(s) 316 impose an AFR $\Delta$ 312 that should be corrected as such changes are not attributable to the fuel injector rate change. For example, the engine 102 may be operating at a first engine operating condition 316 with a lambda 1.5 during a time when the injection control module 318 commands the fuel injector 106 to a first injection rate of zero. In the example, the engine 102 may change the engine operating condition 316 to a lambda 1.2 during a time when the injection control module 318 commands the fuel injector 106 to a second injection rate greater than zero. In the example, the fault indicator module 308 may either ignore the test due to the engine operating state change, or the fault indicator module 308 may correct the baseline AFR (i.e. first AFR) if the controller 108 receives sufficient information from the engine 102 to determine that the first AFR should be selected as 1.2 rather than 1.5. In the continuing example, if the second AFR is 0.7 and the passing threshold value 314 is 0.7, the uncorrected AFR delta 312 is 0.8 (i.e. "passed" or fault value 310 not positive) where the corrected AFR delta 312 should be 0.5 (i.e. "failed" or fault value 310 is positive).

The values for passing threshold values 314 and AFR values may utilize any set of units, for example lambda $$\left(\text{i.e. } \frac{AFR}{AFR_{STOICH}}\right),$$

AFR $$\left(\text{i.e. } \frac{Mass_{air}}{Mass_{fuel}}\right)$$

typically estimated as in-cylinder but can be intake manifold, exhaust manifold, exhaust stream, or other location), percentage excess air, or other units known in the art. Likewise, any conventions of sign regarding AFR changes and injection rate changes are contemplated herein. For example, a first AFR of 1.1 and a second AFR of 0.9 yields and AFR delta of 0.2 or −0.2, depending upon the convention used.

In certain embodiments, the fault indicator module 308 determines the passing value threshold 314 in response to a difference between a first fuel injection rate (e.g. the current injection rate 320 at a first point in time) and a second fuel injection rate (e.g. the current injection rate 320 at a second point in time)—for example a rate change 322 from zero cc/min to 50 cc/min may have a first passing value threshold 314 and a rate change 322 from 5 cc/min to 150 cc/min may have a second passing value threshold 314. In the example the second passing value threshold 314 would ordinarily be expected to be higher than the first passing value threshold 314, since a 145 cc/min injection rate change is larger than a 50 cc/min injection rate change and would ordinarily be expected to create a larger AFR $\Delta$ 312 with a properly operating fuel injector 106. In certain embodiments, the fault indicator module determines the passing threshold value 314 in response to a magnitude of the change in the injection rate 322 of the fuel injector.

In certain embodiments, the injection control module 318 performs at least one additional injection rate change 322 of the fuel injector 306, and the air fuel ratio module 302 determines an additional air fuel ratio 304 corresponding to each additional injection rate change 322. In certain further embodiments, the fault indicator module 308 determines the fault value 310 in response to the additional air fuel ratio(s) 304 corresponding to each additional injection rate change 322. In certain embodiments, the fuel injector 106 may inject at a plurality of fuel injection rates 320 in response to the at least one additional injection rate change 322. For example, the injection rate changes 322 may include injection rate changes from zero cc/min to 50 cc/min as a first rate change 322, and zero cc/min to 75 cc/min as a second rate change 322. In a further example, the fuel injector 306 may perform each injection rate change 322 three times.

In certain embodiments, the fault indicator module 308 determines the AFR $\Delta$ value(s) 312 at each injection rate change 322 in response to the fuel injector 306 changes as a function of the rate changes. For example, and without limitation, the fault indicator module 308 may determine the AFR $\Delta$ value(s) 312 as an average of AFR changes across a plurality of injection rate changes 322, and/or as a function of engine operating conditions 316 determining that one of the plurality of injection rate changes 322 is more reliable than other changes (e.g. fewer changes in engine speed and fueling during the injection rate change 322).

In certain embodiments, the injection control module 318 changes the injection rate 320 of the fuel injector 106 for an amount of time less than a specified period 324. In certain embodiments, the specified period 324 is less than about 5 seconds. In certain embodiments, the specified period 324 is greater than about 1 second. In certain embodiments, the specified period 324 is between about 1 second and about 59 seconds. In certain embodiments, the specified period 324 is a thermally insignificant time period 326. In certain further embodiments, a thermally insignificant time period 326 includes a thermal response time of a temperature sensor 328, a thermal response time of an oxidation catalyst 330, and/or a thermal response time of a particulate filter 332.

In certain embodiments, the thermal response time(s) 328, 330, 332 include an amount of time in which a temperature change greater than a threshold temperature change 334 occurs. In certain embodiments, the threshold temperature change 334 is an absolute threshold 336 (e.g. 25° C.) or absolute temperature change amount. In certain embodiments, the threshold temperature change 334 is an expected temperature change ratio amount 338. For example, if an injection rate change 322 leads to an expected temperature change amount of 40° C. in a component and the expected temperature change ratio amount 338 is 50% of the expected temperature change, then the threshold temperature change 334 in the example is 20° C. Any value for an expected temperature change ratio amount 338 known in the art may be utilized, and the expected temperature change may be, without limitation, a calculated value, an estimated value, and/or a value previously stored in a memory location on the processing subsystem 300. In certain embodiments, the expected temperature change is determined according to the fuel injection rate, for example from an equation or table lookup, and may further be corrected for expected catalyst degradation with age, ambient temperatures, and other factors understood to affect the temperature of a component.

In certain embodiments, the fault indicator module 308 determines the fault value 310 by determining a fault increment value 340 and/or a fault decrement value 342. For example, a positive determination that the AFR Δ 312 is below the passing value threshold 314 may result in the fault indicator module 308 determining that a fault increment value 340 is TRUE, and a fault counter may be incremented. In one example, a determination that that the AFR Δ 312 is above the passing value threshold 314 may result in the fault indicator module 308 determining that a fault decrement value 342 is TRUE, and a fault counter may be decremented. In certain embodiments, the fault value 310 may be set to indicate a fault only after some number of fault increment value 340 determinations, with some number of fault decrement value 342 determinations clearing the fault value 310 and/or delaying setting the fault value 310. In certain embodiments, the fault increment value 340 and fault decrement value 342 may be set at different values—for example to set the fault value 310 more quickly or to clear the fault value 310 more quickly. Setting the fault value 310 may include hysteresis and/or other features understood in the art. For example, the fault value 310 may be set at one fault counter value and cleared at a different fault counter value, where the difference between the one fault counter value and the different fault counter value prevents rapid toggling of the fault value 310.

Figure 8:
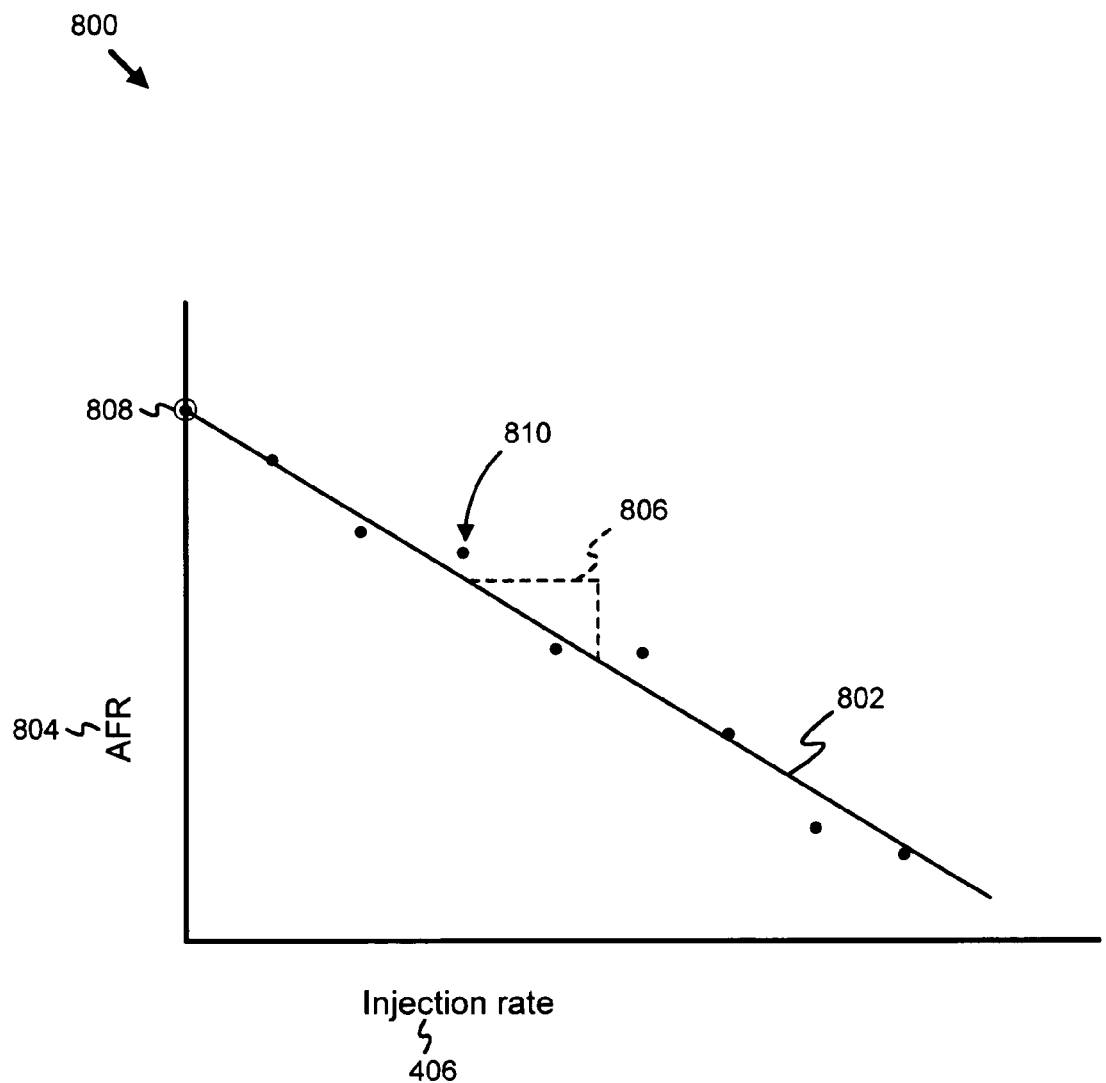
FIG. 8 is an illustration of an injection rate versus air-fuel ratio.

In certain embodiments, the fuel injector 106 injects at a plurality of fuel injection rates 320 and the air fuel ratio module 302 determines a plurality of air fuel ratios 304 corresponding to the fuel injection rates 320. Referencing FIG. 8, an illustration 800 shows a plurality of data points 810 that are injection rates 406 plotted against air fuel ratios 804. The fault indicator module 308 determines a function 344 between the plurality of injection rate changes and the plurality of air fuel ratios, and the fault indicator module 308 further determines the fault value 310 in response to the function 344. Referring back to the illustration in FIG. 8, the function may be a best-fit linear function (line) 802. The fault indicator module 308 determines the fault value 310 in response to the function 344 by any known method, including without limitation utilizing a slope 806 and/or intercept 808 of the function 344. For example, the slope 806 being too steep or too shallow may indicate an injector 106 that is partially clogged, worn, damaged, and/or improperly calibrated. The intercept 808 in an unexpected location may indicate a leaking injector 106. The described behaviors and determinations are exemplary and not limiting.

While the function 344 is shown as a best-fit line 802, the function 344 may be a curve, spline, polynomial, logarithmic, exponential, or any other fit known in the art. The parameters are illustrated as the slope 806 and intercept 808, but may include fit coefficients of any type, averages, statistical parameters such as standard deviations or regression coefficients, and/or any other analysis parameters. Exemplary determinations include, without limitation, determining injector variability, wear, leakage, clogging or plugging.

Figure 4:
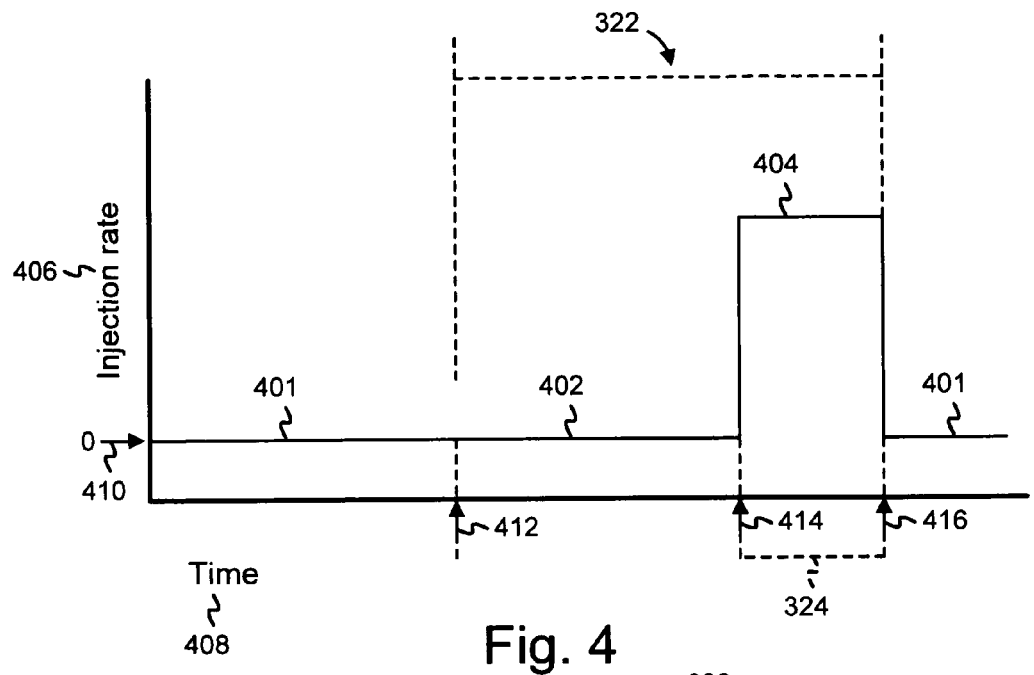
FIG. 4 is an illustration of a fuel injection rate change.

FIG. 4 is an illustration of a fuel injection rate change. FIG. 4 illustrates a fuel injection rate 406 versus time 408 on an arbitrary scale. In the embodiment of FIG. 4, the fuel injector 106 injects at a nominal rate 401 according to the standard fuel injector control scheme at a time 408 prior to the fuel injection rate change 322. The nominal rate 401 in the example of FIG. 4 is zero fueling 410, but the nominal rate 401 could be any injection rate 406 including a variable injection rate 406 with time 408. At a time 412, the injection control module 318 initiates a low injection rate 402, which may be zero fueling 410 or some other injection rate 406 designated to be lower than the high injection rate 404. At a time 414, the injection control module 318 changes the injection rate 406 to a high injection rate 404 for a period not greater than a specified time period 324. In the illustration of FIG. 4, the injection control module 318 returns the injection rate 406 to the nominal rate 401 at the time 416. In certain embodiments, multiple fuel injection rate changes 322 may be performed, and injection rate changes 322 switching from a high injection rate 404 to a low injection rate 402 may be utilized instead of or in addition injection rate changes 322 from a low injection rate 402 to a high injection rate 404. In certain embodiments, an air fuel ratio module determines a first air fuel ratio during the low injection rate 402, and determines a second air fuel ratio during the high injection rate 404.

Figure 5:
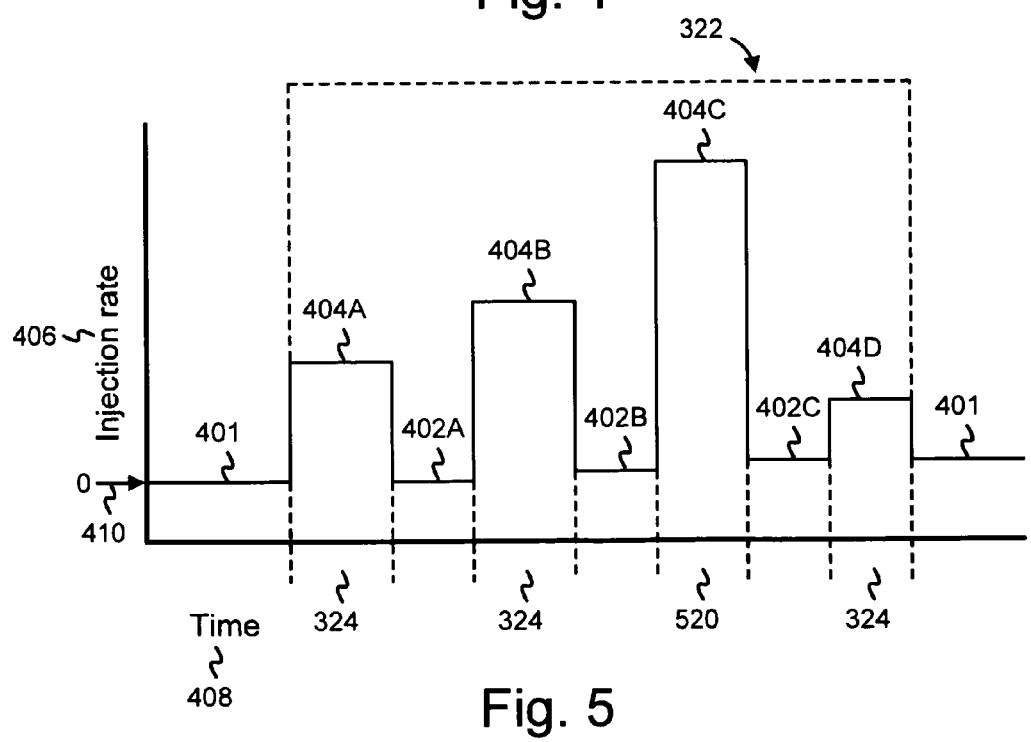
FIG. 5 is an illustration of a plurality of fuel injection rate changes.

FIG. 5 is an illustration of a plurality of fuel injection rate changes 322. Similar to the illustration of FIG. 4, the injection control module 318 operates the injector 106 at the nominal injection rate 401 before and after the injection rate changes 322. In the illustration of FIG. 5, the injection rate changes 322 include alternating the injection rate 406 between a low rate 402A-402C and high rates 404A-404D. The low rate may be zero fueling 410, for example as illustrated by low rate injection event 402A, but the low rate may be higher than zero fueling 410 as illustrated by the low rate injection events 402B and 402C. The high rates 404A-404D, in certain embodiments, are injection events at a plurality of distinct injection rates.

In certain embodiments, the time periods 324, 520 of the injection events are lower than a specified period. In certain embodiments, the specified period is a thermally insignificant time period 326. In certain embodiments, a thermally insignificant time period 326 is a time period in which a thermal response of a component 328, 330, 332 exhibits a thermal response lower than a threshold temperature change 334. In certain embodiments, the time period of a low rate injection event 402A, 402B, 402C may be arbitrarily long because with the low fueling of the low rate injection event 402A, 402B, 402C a component 328, 330, 332 may not experience a thermal response. In the illustration of FIG. 5, the injection control module adjusts a time period 520 of the high rate injection event 404C to avoid inducing a thermal response greater than a threshold temperature change 334 in a component 328, 330, 332.

Figure 6:
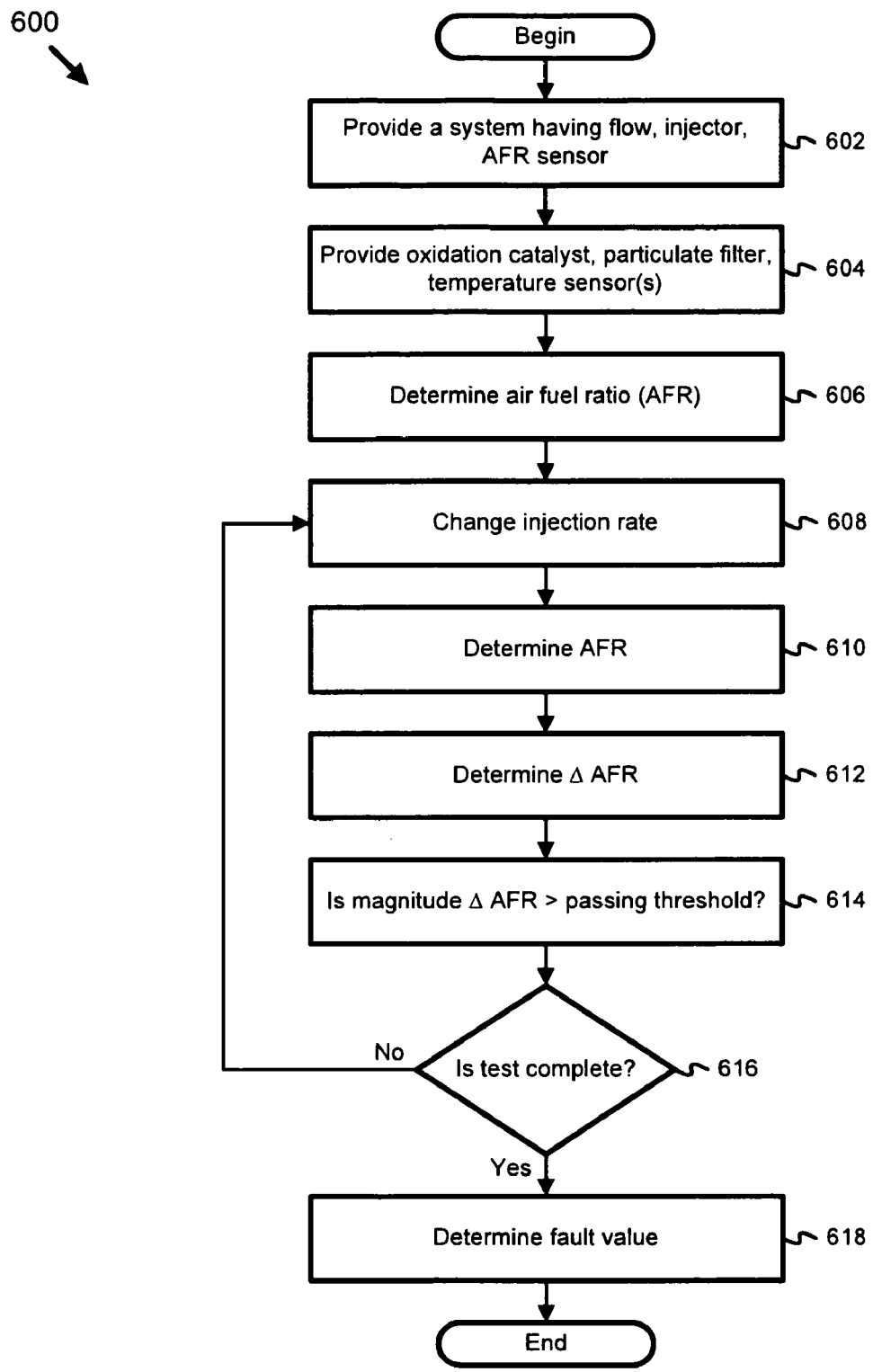
FIG. 6 is a schematic flow diagram of a procedure that determines a fuel injector fault value.
Figure 7:
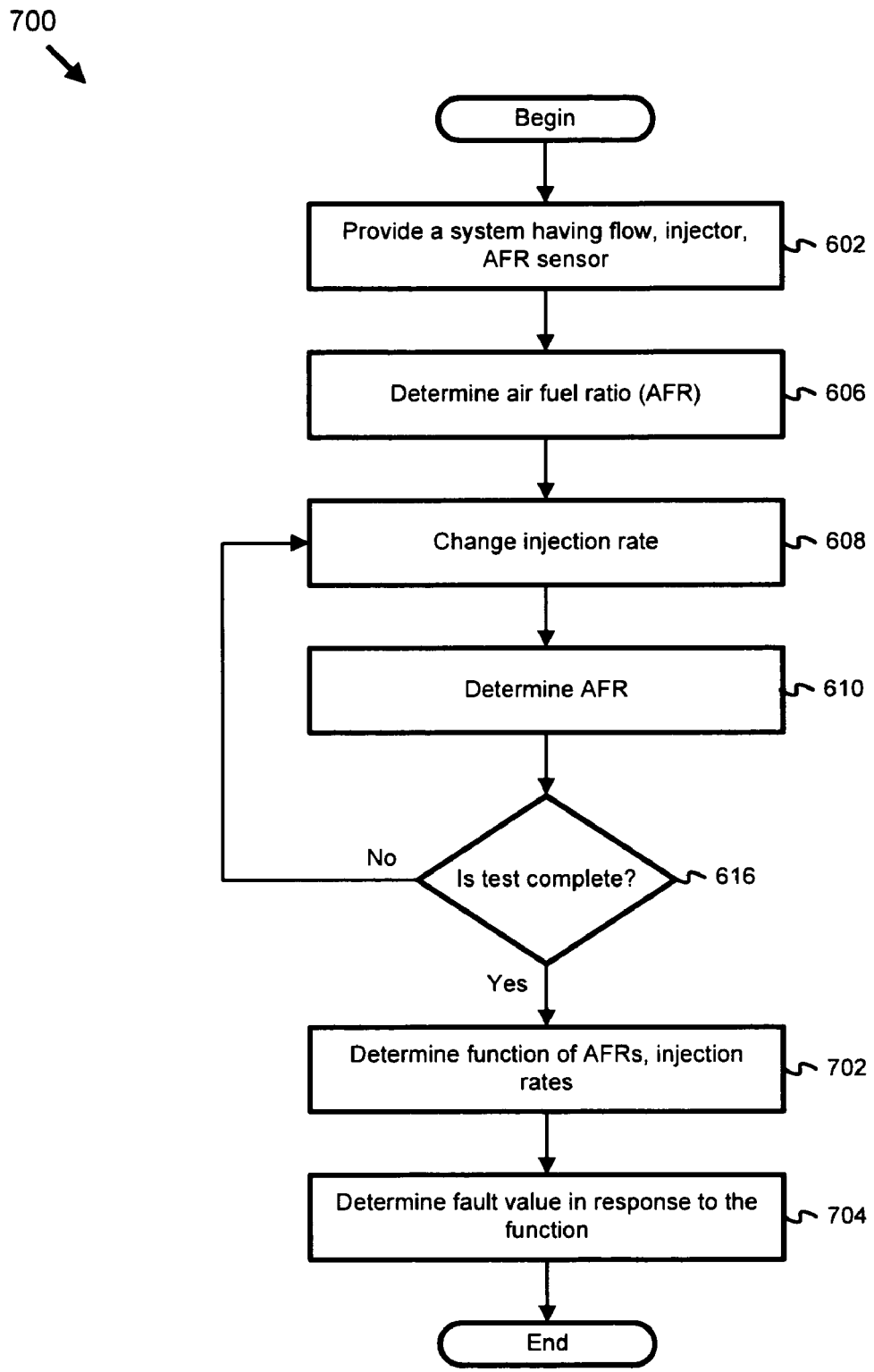
FIG. 7 is a schematic flow diagram of an alternate procedure that determines a fuel injector fault value.

The schematic flow diagram of FIGS. 6 and 7, and related descriptions which follow, provides illustrative embodiments of determining a fuel injector fault value. Operations illustrated are understood to be exemplary only, and operations may be combined or divided, and added or removed, as well as re-ordered in whole or part, unless stated explicitly to the contrary herein.

FIG. 6 is a schematic flow diagram of a procedure 600 that determines a fuel injector fault value 310. The procedure 600 includes an operation 602 to provide a system having a fluid flow, a fuel injector disposed in the fluid flow, and an oxygen sensor (and/or AFR sensor) disposed in the fluid flow at a position downstream of the fuel injector. In certain embodiments, the procedure 600 further includes an operation 604 to provide an oxidation catalyst positioned between the fuel injector and the oxygen sensor, to provide a particulate filter, and to provide one or more temperature sensors. In certain embodiments, the procedure 600 includes an operation 606 to determine a first air fuel ratio (AFR), an operation 608 to change an injection rate of the fuel injector, and an operation 610 to determine a second AFR. In certain embodiments, the procedure 600 further includes an operation 614 to determine 614 whether a magnitude of an AFR differential is greater than a passing threshold. In certain embodiments, the procedure 600 includes an operation (not shown) to adjust a fault counter or otherwise utilize or store the determination 614 for use in determining a fault value. If the determination 616 is YES, the procedure 600 in certain embodiments includes an operation 618 to determine a fault value, and if the determination 616 is NO, the procedure 600 in certain embodiments returns to the operation 608 to change an injection rate of the fuel injector.

FIG. 7 is an alternate procedure 700 for determining a fuel injector fault value 310. The procedure 700 includes an operation to provide a system having a fluid flow, a fuel injector disposed in the fluid flow, and an oxygen sensor disposed in the fluid flow at a position downstream of the fuel injector. The procedure 700 further includes an operation 604 to provide an oxidation catalyst positioned between the fuel injector and the oxygen sensor, to provide a particulate filter, and to provide one or more temperature sensors. The procedure 700 further includes an operation 606 to determine a first air fuel ratio (AFR), an operation 608 to change an injection rate of the fuel injector, and an operation 610 to determine a second AFR. The procedure 700 further includes determining a plurality of air fuel ratios corresponding to a plurality of injection rates by continuing to determine air fuel ratios and fuel injection rates until an operation 616 to check whether the test is complete returns a YES value indicating that the plurality of air fuel ratios corresponding to a plurality of injection rates are complete. The procedure 700 further includes an operation 702 to determine a function between the plurality of injection rates and the plurality of air fuel ratios, and an operation 704 to determine the fault value for the fuel injector in response to the function.

As is evident from the figures and text presented above, a variety of embodiments according to the present invention are contemplated.

A method includes providing a system having a fluid flow, a fuel injector disposed in the fluid flow, and an oxygen sensor disposed in the fluid flow at a position downstream of the fuel injector. In certain embodiments, the method includes determining a first air fuel ratio, changing an injection rate of the fuel injector and determining a second air fuel ratio, and determining a fault value for the fuel injector in response to the first air fuel ratio and the second air fuel ratio.

In certain embodiments, the method of claim includes determining the fault value for the fuel injector by determining a difference between the first air fuel ratio and the second air fuel ratio, and by determining that the fault value is positive in response to the difference being lower than a passing threshold value. In certain embodiments, method further includes providing an oxidation catalyst positioned between the fuel injector and the oxygen sensor. In certain embodiments, the method of further includes performing additional injection rate change(s) of the fuel injector, determining an additional air fuel ratio corresponding to each additional injection rate change, and determining the fault value by determining the fault value in response to the additional air fuel ratio corresponding to each additional injection rate change.

In certain embodiments, the fuel injector injects at a plurality of fuel injection rates in response to the at least one additional injection rate change. In certain embodiments, the method further includes changing the injection rate of the fuel injector for an amount of time less than a specified period. In certain embodiments, the specified period is a period less than about 5 seconds, and in certain embodiments the specified period is a period greater than about 1 second.

In certain embodiments, the method includes providing an oxidation catalyst positioned between the fuel injector and the oxygen sensor, and the specified period is a thermally insignificant time period. In certain further embodiments, the thermally insignificant time period is a time period lower than a thermal response time of a temperature sensor, a thermal response time of a particulate filter, and/or a thermal response time of the oxidation catalyst. In certain embodiments, the thermal response time(s) include an amount of time in which a temperature change greater than a threshold temperature change occurs. In certain embodiments, the method includes determining a fault value for the fuel injector comprises determining one of a fault increment value and a fault decrement value.

An apparatus includes an air fuel ratio module structured to determine a first air fuel ratio, and an injection control module structured to command a change in an injection rate of a fuel injector. In certain embodiments, the air fuel ratio module is further structured to determine a second air fuel ratio, and a fault indicator module is structured to determine a fault value for the fuel injector in response to the first air fuel ratio and the second air fuel ratio.

In certain embodiments the injection control module is further structured to command a plurality of injection rate changes of the fuel injector, the air fuel ratio module is further structured to determine a plurality of air fuel ratios in response to the plurality of injection rate changes, and the fault indicator module is further structured to determine the fault value in response to the plurality of air fuel ratios. In certain embodiments, the plurality of injection rate changes include alternating injection rates of the fuel injector between a low rate and a plurality of high rates. In certain embodiments, the low rate is zero.17. In certain embodiments, the plurality of high rates comprise a plurality of distinct injection rates.

In certain embodiments, the injection control module is further structured to command each of the plurality of high rates for an amount of time less than a specified period.19. In certain embodiments, the specified period comprises a period between about 1 second and 5 seconds. In certain embodiments, the specified period comprises a period between about 1 second and 59 seconds.

In certain embodiments, the specified period comprises a thermally insignificant time period. In certain embodiments, the thermally insignificant time period comprises a time period lower than at least one thermal response time from the group including a thermal response time of a temperature sensor, a thermal response time of a particulate filter, and/or a thermal response time of the oxidation catalyst. In certain embodiments, the thermal response time comprises an amount of time in which a temperature change greater than a threshold temperature change occurs. In certain embodiments, the threshold temperature change includes an absolute temperature change amount and/or an expected temperature change ratio amount.

In certain embodiments, the fault indicator module is further structured to determine the fault value for the fuel injector by determining one of a fault increment value and a fault decrement value. In certain embodiments, the fault indicator module is further structured to determine the fault value in response to the first air fuel ratio and the second air fuel ratio by determining a difference between the first air fuel ratio and the second air fuel ratio, and by determining that the fault value is positive in response to the difference being lower than a passing threshold value. In certain embodiments, the fault indicator module is further structured to determine the passing threshold value in response to at least one of an engine operation condition (or conditions) and a magnitude of the change in the injection rate of the fuel injector.

The apparatus may further include the fault indicator module further determining a function between the plurality of injection rate changes and the plurality of air fuel ratios, and the fault indicator module further determining the fault value in response to the function. The function may be a best-fit linear function.

A system includes an internal combustion engine producing an exhaust flow, a fuel injector disposed in the exhaust flow, and an oxygen sensor disposed in the exhaust flow at a location downstream of the fuel injector. In certain embodiments, the system includes a particulate filter interposed between the fuel injector and the oxygen sensor. In certain embodiments, the system further includes a controller structured to determine a first fuel injection rate and a first air fuel ratio, to command the fuel injector to a second fuel injection rate for a specified period, to determine a second air fuel ratio, and to determine a fault value in response to the first air fuel ratio and the second air fuel ratio.

In certain embodiments, the specified period comprises a time period between about 1 and about 5 seconds. In certain embodiments, the controller is further structured to command the fuel injector to at least one additional fuel injection rate, and to determine an air fuel ratio corresponding to each at least one additional fuel injection rate. In certain embodiments, the controller is further structured to determine the fault value in response to the air fuel ratio corresponding to each at least one additional fuel injection rate. In certain embodiments, the controller is further structured to determine a fault value in response to the first air fuel ratio and the second air fuel ratio by determining a difference between the first air fuel ratio and the second air fuel ratio, and by determining that the fault value is positive in response to the difference being lower than a passing threshold value.

In certain embodiments, the controller is further structured to determine the passing threshold value in response to a difference between the first fuel injection rate and the second fuel injection rate. In certain embodiments, the controller is further structured to determine the passing threshold value in response to at least one engine operating condition. In certain embodiments, the controller is further structured to correct the difference between the first air fuel ratio and the second air fuel ratio in response to at least one engine operating condition.

In certain embodiments, the system further includes an oxidation catalyst interposed between the fuel injector and the oxygen sensor. In certain embodiments, the system further includes a temperature sensor positioned to measure a temperature related to a temperature of the oxidation catalyst, and the specified period comprises a value lower than a thermal response time of the temperature sensor. In certain embodiments, the system further includes a temperature sensor positioned to measure a temperature related to a temperature of the oxidation catalyst, and the specified period comprises a value lower than a thermal response time of the oxidation catalyst at a greatest fuel injection rate between the first fuel injection rate and the second fuel injection rate.

In certain embodiments, the first fuel injection rate is zero. In certain embodiments, the controller is further structured to command a plurality of injection rate changes of the fuel injector, where the plurality of injection rate changes include alternating an injection rate of the fuel injector between a low rate and a plurality of high rates, to determine a plurality of air fuel ratios in response to the plurality of injection rate changes, and to determine the fault value in response to the plurality of air fuel ratios. In certain embodiments, the controller is further structured to determine the fault value in response to the plurality of air fuel ratios by determining an air fuel ratio delta for the injection rate changes, and determining whether the air fuel ratio delta has a magnitude greater than a passing threshold value.

An exemplary method includes providing a system having a fluid flow, a fuel injector disposed in the fluid flow, and an oxygen sensor disposed in the fluid flow at a position downstream of the fuel injector. The method further includes determining a first air fuel ratio from an output of the oxygen sensor, changing an injection rate of the fuel injector and determining a second air fuel ratio from an output of the oxygen sensor, and determining a fault value for the fuel injector in response to the first air fuel ratio and the second air fuel ratio. The method further includes determining a plurality of air fuel ratios corresponding to a plurality of injection rates, determining a function between the plurality of injection rates and the plurality of air fuel ratios, and determining the fault value for the fuel injector in response to the function. The function may be a best-fit linear function.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred, more preferred or exemplary utilized in the description above indicate that the feature so described may be more desirable or characteristic, nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
providing a system having a fluid flow, a fuel injector disposed in the fluid flow, and an oxygen sensor disposed in the fluid flow at a position downstream of the fuel injector;
determining a first air fuel ratio from an output of the oxygen sensor;
changing an injection rate of the fuel injector and determining a second air fuel ratio from an output of the oxygen sensor; and
determining a fault value for the fuel injector in response to the first air fuel ratio and the second air fuel ratio.

2. The method of claim 1, further comprising determining a plurality of air fuel ratios corresponding to a plurality of injection rates, determining a function between the plurality of injection rates and the plurality of air fuel ratios, and wherein determining the fault value for the fuel injector is further in response to the function.

3. The method of claim 2, wherein the function comprises a best-fit linear function.

4. The method of claim 1, wherein determining the fault value for the fuel injector comprises determining a difference between the first air fuel ratio and the second air fuel ratio, and determining that the fault value is positive in response to the difference being lower than a passing threshold value.

5. The method of claim 1, further comprising providing an oxidation catalyst positioned between the fuel injector and the oxygen sensor.

6. The method of claim 1, further comprising performing at least one additional injection rate change of the fuel injector, determining an additional air fuel ratio corresponding to each additional injection rate change, and wherein determining the fault value further comprises determining the fault value in response to the additional air fuel ratio corresponding to each additional injection rate change.

7. The method of claim 6, wherein the fuel injector injects at a plurality of fuel injection rates in response to the at least one additional injection rate change.

8. The method of claim 1, further comprising changing the injection rate of the fuel injector for an amount of time less than a specified period.

9. The method of claim 8, wherein the specified period comprises a period less than about 5 seconds and greater than about 1 second.

10. The method of claim 8, further comprising providing an oxidation catalyst positioned between the fuel injector and the oxygen sensor, and wherein the specified period comprises a thermally insignificant time period comprising a time period lower than at least one thermal response time selected from the group consisting of: a thermal response time of a temperature sensor, a thermal response time of a particulate filter, and a thermal response time of the oxidation catalyst.

11. An apparatus comprising:
an air fuel ratio module structured to determine a first air fuel ratio from an oxygen sensor output;
an injection control module structured to command a change in an injection rate of a fuel injector, wherein the air fuel ratio module is further structured to determine a second air fuel ratio from the oxygen sensor output; and
a fault indicator module structured to determine a fault value for the fuel injector in response to the first air fuel ratio and the second air fuel ratio.

12. The apparatus of claim 11, wherein the injection control module is further structured to command a plurality of injection rate changes of the fuel injector, wherein the air fuel ratio module is further structured to determine a plurality of air fuel ratios in response to the plurality of injection rate changes, and wherein the fault indicator module is further structured to determine the fault value in response to the plurality of air fuel ratios.

13. The apparatus of claim 12, wherein the fault indicator module is further structured to determine a function between the plurality of injection rate changes and the plurality of air fuel ratios, and wherein the fault indicator module is further structured to determine the fault value in response to the function.

14. The apparatus of claim 13, wherein the function comprises a best-fit linear function.

15. The apparatus of claim 12, wherein the plurality of injection rate changes comprises alternating an injection rate of the fuel injector between a low rate and a plurality of high rates.

16. The apparatus of claim 15, wherein the low rate is zero.

17. The apparatus of claim 15, wherein the plurality of high rates comprise a plurality of distinct injection rates.

18. The apparatus of claim 13, wherein the injection control module is further structured to command each of the plurality of high rates for an amount of time less than a specified period comprising a thermally insignificant time period.

19. The apparatus of claim 18, wherein the thermally insignificant time period comprises a time period lower than at least one thermal response time selected from the group consisting of: a thermal response time of a temperature sensor, a thermal response time of a particulate filter, and a thermal response time of the oxidation catalyst.

20. The apparatus of claim 19, wherein the thermal response time comprises an amount of time in which a temperature change greater than a threshold temperature change occurs, and wherein the threshold temperature change comprises one of an absolute temperature change amount and an expected temperature change ratio amount.

21. The apparatus of claim 13, wherein the fault indicator module is further structured to determine the fault value in response to a first air fuel ratio corresponding to the low rate and a second air fuel ratio corresponding to one of the plurality of high rates by determining a difference between the first air fuel ratio and the second air fuel ratio, and by determining that the fault value is positive in response to the difference being lower than a passing threshold value, and wherein the fault indicator module is further structured to determine the passing threshold value in response to at least one of:
at least one engine operating condition; and
a magnitude of the difference between the low rate and the one of the plurality of high rates of the fuel injector.

22. A system comprising:
an internal combustion engine producing an exhaust flow;
a fuel injector disposed in the exhaust flow;
an oxygen sensor disposed in the exhaust flow at a location downstream of the fuel injector;
a controller structured to:
determine a first fuel injection rate and a first air fuel ratio;

command the fuel injector to a second fuel injection rate for a specified period;

determine a second air fuel ratio; and determine a fault value in response to the first air fuel ratio and the second air fuel ratio.

23. The system of claim 22, wherein the controller is further structured to command the fuel injector to at least one additional fuel injection rate, determining an air fuel ratio corresponding to each at least one additional fuel injection rate, and wherein the controller is further structured to determine the fault value in response to the air fuel ratio corresponding to each at least one additional fuel injection rate.

24. The system of claim 22, wherein the controller is further structured to determine a fault value in response to the first air fuel ratio and the second air fuel ratio by determining a difference between the first air fuel ratio and the second air fuel ratio, and by determining that the fault value is positive in response to the difference being lower than a passing threshold value.

25. The system of claim 24, wherein the controller is further structured to determine the passing threshold value in response to one of:

a difference between the first fuel injection rate and the second fuel injection rate; and at least one engine operating condition.

26. The system of claim 24, wherein the controller is further structured to correct the difference between the first air fuel ratio and the second air fuel ratio in response to at least one engine operating condition.

27. The system of claim 22, further comprising an oxidation catalyst interposed between the fuel injector and the oxygen sensor.

28. The system of claim 27, further comprising a temperature sensor positioned to measure a temperature related to a temperature of the oxidation catalyst, wherein the specified period comprises a value lower than a thermal response time of the temperature sensor.

29. The system of claim 27, further comprising a temperature sensor positioned to measure a temperature related to a temperature of the oxidation catalyst, wherein the specified period comprises a value lower than a thermal response time of the oxidation catalyst at a greatest fuel injection rate between the first fuel injection rate and the second fuel injection rate.

30. The system of claim 22, further comprising a particulate filter interposed between the fuel injector and the oxygen sensor.

31. The system of claim 22, wherein the first fuel injection rate is zero.

32. The system of claim 22, wherein the controller is further structured to:

command a plurality of injection rate changes of the fuel injector, wherein the plurality of injection rate changes comprise alternating an injection rate of the fuel injector between a low rate and a plurality of high rates;

determine a plurality of air fuel ratios in response to the plurality of injection rate changes; and determine the fault value in response to the plurality of air fuel ratios.

33. The system of claim 32, wherein the controller is further structured to determine the fault value in response to the plurality of air fuel ratios by determining an air fuel ratio delta for the injection rate changes, and determining whether the air fuel ratio delta has a magnitude greater than a passing threshold value.

* * * * *